US005741992A

United States Patent [19]

Nagata

[11] Patent Number: 5,741,992

[45] Date of Patent: Apr. 21, 1998

[54] MUSICAL APPARATUS CREATING CHORUS SOUND TO ACCOMPANY LIVE VOCAL SOUND

[75] Inventor: Yuichi Nagata, Hamamatau, Japan

[73] Assignee: Yamaha Corporation, Hamamatsu, Japan

[21] Appl. No.: 707,221

[22] Filed: Sep. 3, 1996

[30] Foreign Application Priority Data

Sep. 4, 1996 [JP] Japan .................................... 7-226604

[51] Int. Cl.$^{6}$ ................................ G09B 5/00; G10H 1/02

[52] U.S. Cl. ................................ 84/631; 84/664; 84/708; 84/DIG. 1; 84/DIG. 4; 434/307 A

[58] Field of Search ..................... 84/626–633, 662–665, 84/701–711, 737–741, DIG. 1, DIG. 4, DIG. 26, DIG. 27, 601, 602, 609–614, 634–638; 381/61–65; 434/307 A

[56] References Cited

U.S. PATENT DOCUMENTS

| | | | |
|---|---|---|---|
| 4,008,641 | 2/1977 | Takada et al. | 84/DIG. 1 |
| 4,038,898 | 8/1977 | Kniepkamp et al. | 84/DIG. 4 |
| 5,477,003 | 12/1995 | Muraki et al. | 84/610 |
| 5,518,408 | 5/1996 | Kawashima et al. | 84/609 X |
| 5,521,326 | 5/1996 | Sone | 84/631 |
| 5,543,579 | 8/1996 | Morinaga et al. | 84/DIG. 1 |
| 5,621,182 | 4/1997 | Matsumoto | 84/610 |

*Primary Examiner*—Stanley J. Witkowski
*Attorney, Agent, or Firm*—Pillsbury Madison & Sutro LLP

[57] ABSTRACT

A chorus apparatus creates an artificial chorus sound in parallel to a live vocal sound. A pickup collects a live vocal sound and converts the collected live vocal sound into a corresponding vocal sound signal. A generator device generates a chorus sound signal representative of an artificial chorus sound in synchronization with the vocal sound signal. A plurality of output devices are installed separately from each other to define different sound sources. One of the output devices receives the vocal sound signal and acoustically reproduces therefrom the live vocal sound. Another of the output devices receives the chorus sound signal and acoustically reproduces therefrom the artificial chorus sound so that the live vocal sound and the artificial chorus sound can be mixed as if sounded from different sound sources.

15 Claims, 2 Drawing Sheets

MUSICAL APPARATUS CREATING CHORUS SOUND TO ACCOMPANY LIVE VOCAL SOUND

BACKGROUND OF THE INVENTION

The present invention relates to a chorus effect creating apparatus suitable for use in, for example, a karaoke machine.

As is known in the field of the karaoke or the like, various chorus effect creating apparatuses have been developed which automatically create an artificial chorus sound formed in consonance with a singing voice (hereinafter, referred to as "vocal sound") inputted through a microphone, so that the chorus sound can be mixed to the vocal sound.

For example, in one type of the chorus effect creating apparatus, chorus data is recorded in advance by sampling a model chorus sound according to ADPCM (Adaptive Differential Pulse Code Modulation). The chorus sound is created by reproducing the recorded data to accompany a live vocal sound collected through a microphone.

The applicant has proposed another type of the chorus effect creating apparatus in Japanese Patent Application No. 7-16181. In this apparatus, by shifting a pitch of a live vocal sound inputted through a microphone, a chorus sound corresponding to the live vocal sound is generated so as to accompany the vocal sound.

However, in the conventional chorus effect creating apparatus, the live vocal sound and the synthesized chorus sound are acoustically reproduced and emitted through a common loudspeaker via a common output channel. Thus, there has been a problem that reality or presence as if a plurality of singers separately sing vocal and chorus parts cannot be achieved.

SUMMARY OF THE INVENTION

The present invention has been made under such a background and has an object to provide a chorus effect creating apparatus which can achieve a chorus effect full of reality and presence better simulating actual chorus performance.

According to the invention, a chorus apparatus for creating an artificial chorus sound in parallel to a live vocal sound comprises a pickup device that collects a live vocal sound and that converts the collected live vocal sound into a corresponding vocal sound signal, a generator device that generates a chorus sound signal representative of an artificial chorus sound in synchronization with the vocal sound signal, and a plurality of output devices installed separately from each other to define different sound sources, one of the output devices receiving the vocal sound signal and acoustically reproducing therefrom the live vocal sound, and another of the output devices receiving the chorus sound signal and acoustically reproducing therefrom the artificial chorus sound so that the live vocal sound and the artificial chorus sound can be mixed as if sounded from different sound sources.

Preferably, the generator device generates a multiple of chorus sound signals representative of multiple parts of the artificial chorus sound, and corresponding ones of the output devices receive the respective chorus sound signals separately from each other to concurrently reproduce the multiple parts of the artificial chorus sound.

In one form, the generator device processes the vocal sound signal to modify the same into the chorus sound signal so that the artificial chorus sound depends on and originates from the live vocal sound.

Specifically, the generator device comprises a memory that stores a main melody data representative of a main melody pattern of the live vocal sound and a chorus melody data representative of a chorus melody pattern of the artificial chorus sound, a pitch difference calculator that sequentially retrieves the main melody data and the chorus melody data from the memory in synchronization with progression of the live vocal sound and that calculates a pitch difference between the main melody pattern and the chorus melody pattern according to the retrieved main melody data and the chorus melody data, and a pitch converter that shifts a pitch of the vocal sound signal by the calculated pitch difference to generate the chorus sound signal.

In another form, the generator device comprises a data source that provides a waveform data sampled from a model chorus sound, and a decoder that sequentially receives the waveform data and that decodes the waveform data to generate the chorus sound signal so that the artificial chorus sound is reproduced in the form of the model chorus sound which is independent from the live vocal sound.

DETAILED DESCRIPTION OF THE INVENTION

Figure 1:
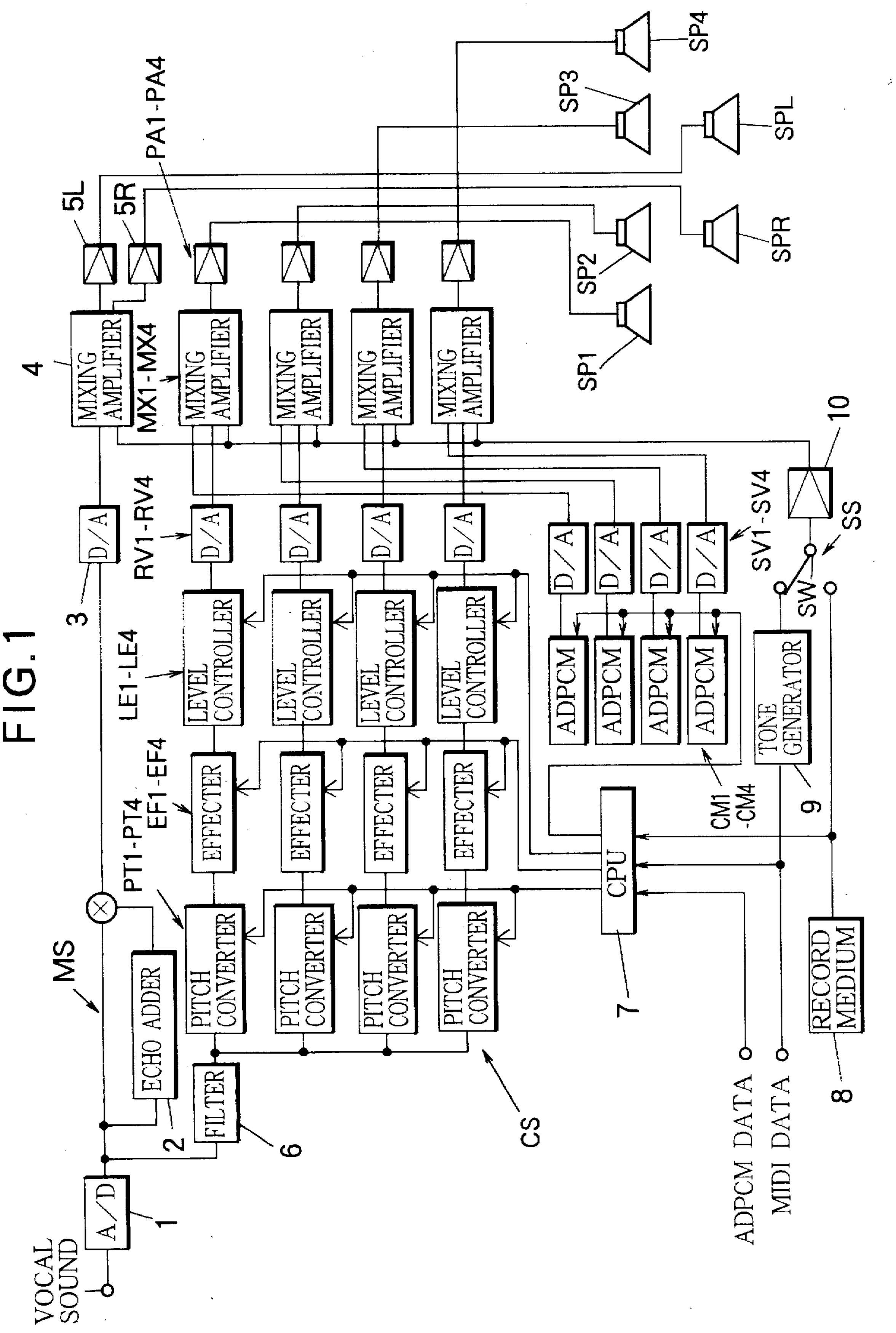
FIG. 1 is a block diagram showing one embodiment of the present invention.

Hereinbelow, a preferred embodiment of the present invention will be described with reference to the drawings. FIG. 1 is a block diagram showing one embodiment of the present invention. In this embodiment, a chorus effect creating apparatus according to the present invention is arranged in the form of a karaoke machine which reproduces a karaoke musical piece to accompany a singing voice (hereinafter, referred to as "vocal sound") inputted through a microphone. However, the present invention is not limited to such a karaoke machine at all.

In FIG. 1, an A/D (analog/digital) converter 1 is provided for converting an input signal of a vocal sound collected by a pickup device such as a microphone into a corresponding digital signal. The vocal sound signal outputted from the A/D converter 1 is divided into a main vocal system MS and a chorus system CS.

First, in the main vocal system MS, an echo adder 2 is provided for adding an echo component to the vocal sound signal outputted from the A/D converter 1. A D/A converter 3 is connected for converting the vocal sound signal added with the foregoing echo component into a corresponding analog signal. Further, a mixing amplifier 4 is provided for mixing the vocal sound signal fed through the D/A converter 3 with a source signal representative of a karaoke accompaniment or else fed from a later-described source system SS. Then, the mixing amplifier 4 outputs the mixed signals to a pair of left and right channels. Next, power amplifiers 5L and 5R are provided for the left and right channels, respectively, which amplify the outputs of the mixing amplifier 4 for the corresponding channels. Further, main vocal outputting speakers SPL and SPR are provided for the left and right channels, respectively, which acoustically reproduce the vocal sound together with the echo component and the karaoke accompaniment based on the outputs from the corresponding power amplifiers 5L and 5R. Namely, the power amplifiers 5L and 5R constitute one output device for acoustically reproducing the vocal sound from the vocal sound signal.

Now, the chorus system CS will be explained. A filter 6 is provided for removing unnecessary frequency components such as a noise from the vocal sound signal outputted from the A/D converter 1. The vocal sound signal outputted from the filter 6 is divided into a multiple channels of the chorus system CS. In this embodiment, the multiple channels are assigned to four chorus parts of the chorus sound.

Pitch converters PT1–PT4 are provided for producing chorus sounds of the respective parts. The pitch converters PT1–PT4 shift a pitch (frequency) of the vocal sound signal by predetermined degrees, respectively, for producing chorus sounds of the respective parts in consonance with the inputted vocal sound. The pitch converters PT1–PT4 output the differently pitch-shifted vocal sound signals as chorus sound signals. The pitch shift amounts in the pitch converters PT1–PT4 are controlled by a CPU 7. Thus, the pitch converters PT1–PT4 constitute a generator device that generates a multiple of the chorus sound signals.

Next, EF1–ER4 denote four effecters, respectively. Under the control of the CPU 7, the effecters EF1–EF4 process the chorus sound signals fed from the corresponding pitch converters PT1–PT4 so as to add an acoustic effect such as echo. LE1–LE4 denote four level controllers, respectively. Under the control of the CPU 7, the level controllers LE1–LE4 control sound volume levels of the chorus sound signals outputted from the corresponding effecters EF1–EF4. Further, RV1–RV4 denote D/A (digital/analog) converters, respectively, which convert the digital chorus sound signals outputted from the corresponding level controllers LE1–LE4 into analog chorus sound signals.

Next, MX1–MX4 denote mixing amplifiers, respectively, which mix the chorus sound signals of the respective parts fed from the corresponding D/A converters RV1–RV4 with the source signal fed from the later-described source system SS. PA1–PA4 denote power amplifiers, respectively, which amplify the outputs of the corresponding mixing amplifiers MX1–MX4. Further, SP1–SP4 denote chorus outputting speakers, respectively, which acoustically sound the respective parts of the chorus sound based on the outputs from the corresponding power amplifiers PA1–PA4. Namely, the loudspeakers SP1–SP4 constitute a multiple of output devices for acoustically reproducing the multiple parts of the artificial chorus sound.

Next, CM1–CM4 denote ADPCM decoders, respectively, which decode ADPCM data representative of the chorus sound fed from an external memory through the CPU 7 so as to reproduce the chorus sound signals. Further, SV1–SV4 denote D/A converters, respectively, which convert the digital chorus sound signals outputted from the corresponding ADPCM decoders CM1–CM4 into analog chorus sound signals. The D/A converters SV1–SV4 output them to the mixing amplifiers MX1–MX4. Thus, the ADPCM decoders CM1–CM4 constitute another generator device that generates a multiple of the chorus sound signals.

Specifically, in this embodiment, there are two operation modes with respect to generation of the chorus sound. Namely, in the pitch shift mode, the chorus sound is generated by pitch-shifting the vocal sound. The other ADPCM mode reproduces the chorus sound recorded in advance by sampling a waveform of a model chorus sound through the ADPCM. The mixing amplifiers MX1–MX4 mix the chorus sound signals fed from the D/A converters RV1–RV4 and the source signal with each other in the pitch shift mode. Otherwise, the mixing amplifiers MX1–MX4 mix the chorus sound signals fed from the D/A converters SV1–SV4 and the source signal with each other in the ADPCM mode.

The CPU 7 receives song data including a main melody data representative of a main melody pattern of the vocal sound, a chorus melody data representing a chorus melody pattern of each chorus part added to the vocal sound, a chord data, a level control data, effect control parameters and the like. These data may be provided in the form of MIDI data fed from an exterior device. Otherwise, these data may be stored in a later-described record medium 8 together with the source signal. The CPU 7 controls, based on these data, the generation and processing of the chorus sound through the pitch converters PT1–PT4, the effecters EF1–EF4 and the level controllers LE1–LE4, Here, the pitch shift amount used for generating the chorus sound is determined depending on a pitch difference between the main melody pattern and the chorus melody pattern as disclosed in Japanese Patent Application No. 7-16181. Further, the CPU 7 outputs the ADPCM data representative of the chorus sounds supplied from the exterior device to the ADPCM decoders CM1–CM4 corresponding to the respective chorus parts.

Now, the source system SS will be explained. A tone generator 9 produces the source signal according to the MIDI (Musical Instrument Digital Interface) data supplied from the exterior data source. The record medium 8 is, for example, composed of an LD (Laser Disk), a CDV (Compact Disk Video), a CD (Compact Disk) or the like for recording the music data necessary for generating the source signal representative of karaoke accompaniment or else and for generating the chorus sound signal. Specifically, in this embodiment, there are two operation modes with respect to the input of the source signal, one being an MIDI input mode based on the input of the MIDI data, and the other being a medium input mode based on the data reproduction from the record medium 8. A selector switch SW is provided for switching the source signal to be inputted. The selector switch SW is switched to the tone generator 9 in the MIDI input mode, while the same is switched to the record medium 8 in the medium input mode. The source signal selectively inputted by means of the selector switch SW is amplified by a preamplifier 10, and is then supplied to the foregoing mixing amplifier 4 in the main vocal system MS and to the foregoing mixing amplifiers MX1–MX4 in the chorus system CS.

As described above, the inventive chorus apparatus creates an artificial chorus sound in parallel to a live vocal sound. The pickup device such as the microphone collects a live vocal sound and converts the collected live vocal sound into a corresponding vocal sound signal. The generator device such as the pitch converter PT or the ADPCM decoder CM generates a chorus sound signal representative of an artificial chorus sound in synchronization with the vocal sound signal. The plurality of the output devices are installed separately from each other to define different sound sources in the form of the loudspeakers SP1–SP4, SPL and SPR. One of the output devices receives the vocal sound signal and acoustically reproduces therefrom the live vocal sound. Another of the output devices receives the chorus sound signal and acoustically reproduces therefrom the artificial chorus sound so that the live vocal sound and the artificial chorus sound can be mixed as if sounded from different sound sources. Preferably, the generator device generates a multiple of chorus sound signals representative of multiple parts of the artificial chorus sound, and corresponding ones of the output devices receive the respective chorus sound signals separately from each other to concurrently reproduce the multiple parts of the artificial chorus sound. In one mode, the generator device in the form of the pitch converter PT processes the vocal sound signal to modify the same into the chorus sound signal so that the artificial chorus sound depends on and originates from the live vocal sound. In another mode, the generator device comprises a data source that provides a waveform data provisionally sampled from a model chorus sound, and the ADPCM decoder CM that sequentially receives the waveform data and that decodes the waveform data to generate the chorus sound signal so that the artificial chorus sound is reproduced in the form of the model chorus sound which is independent from the live vocal sound.

Now, the operation of the chorus effect creating apparatus will be explained. Hereinbelow, the operation mode with respect to the generation of the chorus sound and the other operation mode with respect to the input of the source signal will be separately explained.

In Case of Pitch Shift Mode and MIDI Input Mode, the vocal sound signal fed through the microphone is converted into the corresponding digital signal by the A/D converter 1, and is then divided into the main vocal system MS and the chorus system CS. The vocal sound signal fed to the main vocal system MS is added with the echo component by the echo adder 2, then converted into the analog signal by the D/A converter 3, and thereafter supplied to the mixing amplifier 4. On the other hand, the vocal sound signal divided into the chorus system CS passes through the filter 6, then fed to the pitch converters PT1–PT4 so as to be used for producing each part of the chorus sound.

In this case, the source system SS is placed in the MIDI input mode so that the switch SW is connected to the tone generator 9. By this, the MIDI data inputted from the exterior data source is supplied to the CPU 7 and to the tone generator 9, respectively. The CPU 7 controls the generation of the chorus sound based on the main melody data, the chorus melody data of each part, the chord data and the like contained in the MIDI data. By this, in the chorus system CS, the chorus sound signals corresponding to the respective parts are produced and supplied to the mixing amplifiers MX1–MX4, respectively.

On the other hand, the tone generator 9 produces the source signal according to the inputted MIDI data. This source signal is amplified by the preamplifier 10, and then supplied to the mixing amplifier 4 in the main vocal system MS and to the mixing amplifiers MX1–MX4 in the chorus system CS, respectively.

Thus, in the main vocal system MS, the vocal sound signal and the source signal are mixed with each other through the mixing amplifier 4, and then amplified by the power amplifiers 5L and 5R so as to be outputted as the karaoke vocal sounds through the left and right main vocal speakers SPR and SPL. On the other hand, in the chorus system CS, each chorus sound signal of the respective parts and the source signal are mixed with each other through the mixing amplifiers MX1–MX4, respectively, and then amplified by the respective power amplifiers PA1–PA4 so as to be outputted as the karaoke chorus sounds through the chorus outputting speakers SP1–SP4 corresponding to the respective chorus parts.

In Case of Pitch Shift Mode and Medium Input Mode, the source signal of a karaoke song is provided under the medium input mode so that the switch SW is connected to the record medium 8. By this, the source signal reproduced from the record medium 8 is amplified by the preamplifier 10, and is then fed to the mixing amplifier 4 in the main vocal system MS and to the mixing amplifiers MX1–MX4 in the chorus system CS. Further, the main melody data, the chorus melody data, the chord data and the like stored in the record medium 8 along with the foregoing source signal are supplied to the CPU 7 for producing the chorus sound. The remaining operation is the same as in the foregoing first case.

In case of ADPCM Mode and MIDI Input Mode, the generation of the chorus sound is conducted in the ADPCM mode so that the waveform data for generating the vocal chorus is supplied as the ADPCM data. Specifically, the ADPCM data of the respective chorus parts supplied from the exterior data source are fed to the respective ADPCM decoders CM1–CM4 via the CPU 7, and are then decoded. By this, the chorus sound signals of the respective parts are produced. These chorus sound signals are fed to the mixing amplifiers MX1–MX4 in the chorus system CS, respectively, so as to be mixed with the source signal. The remaining operation is the same as in the foregoing first case.

In Case of ADPCM Mode and Medium Input Mode, the source signal is inputted under the medium input mode so that the switch SW is connected to the record medium 8. By this, the karaoke source signal obtained by the data reproduction from the record medium 8 is amplified by the preamplifier 10, and is then supplied to the mixing amplifier 4 in the main vocal system MS and to the mixing amplifiers MX1–MX4 in the chorus system CS so as to be mixed with the chorus sound signals which are created based on the ADPCM data. The remaining operation is the same as in the foregoing third case.

As described above, according to this embodiment, the chorus sounds of the respective parts created in the chorus system CS are acoustically reproduced and emitted from the different speakers SP1–SP4 via the chorus output system which is different from the vocal output system. Thus, the user can enjoy the realistic presence simulating the actual chorus performance. In the foregoing embodiment, the four channels are provided to correspond to the 4-part chorus. However, the invention is not limited thereto naturally. The inventive structure may cover a desired n ($n \geq 1$) part chorus such as 2-part or 3-part chorus.

As described above, according to the invention, the vocal sound and the chorus sound are outputted through the different output systems to realize presence simulating the actual chorus just like auding the main vocal part and the chorus part uttered at different locations. Thus, the chorus effect full of the realistic presence can be obtained. According to the invention, in addition to the foregoing effect, the chorus sound of the respective parts is outputted through the different output systems to realize feeling of the actual chorus performance just like auding the choruses of the respective parts uttered at different places so that the chorus effect full of further realistic presence can be obtained.

Figure 2:
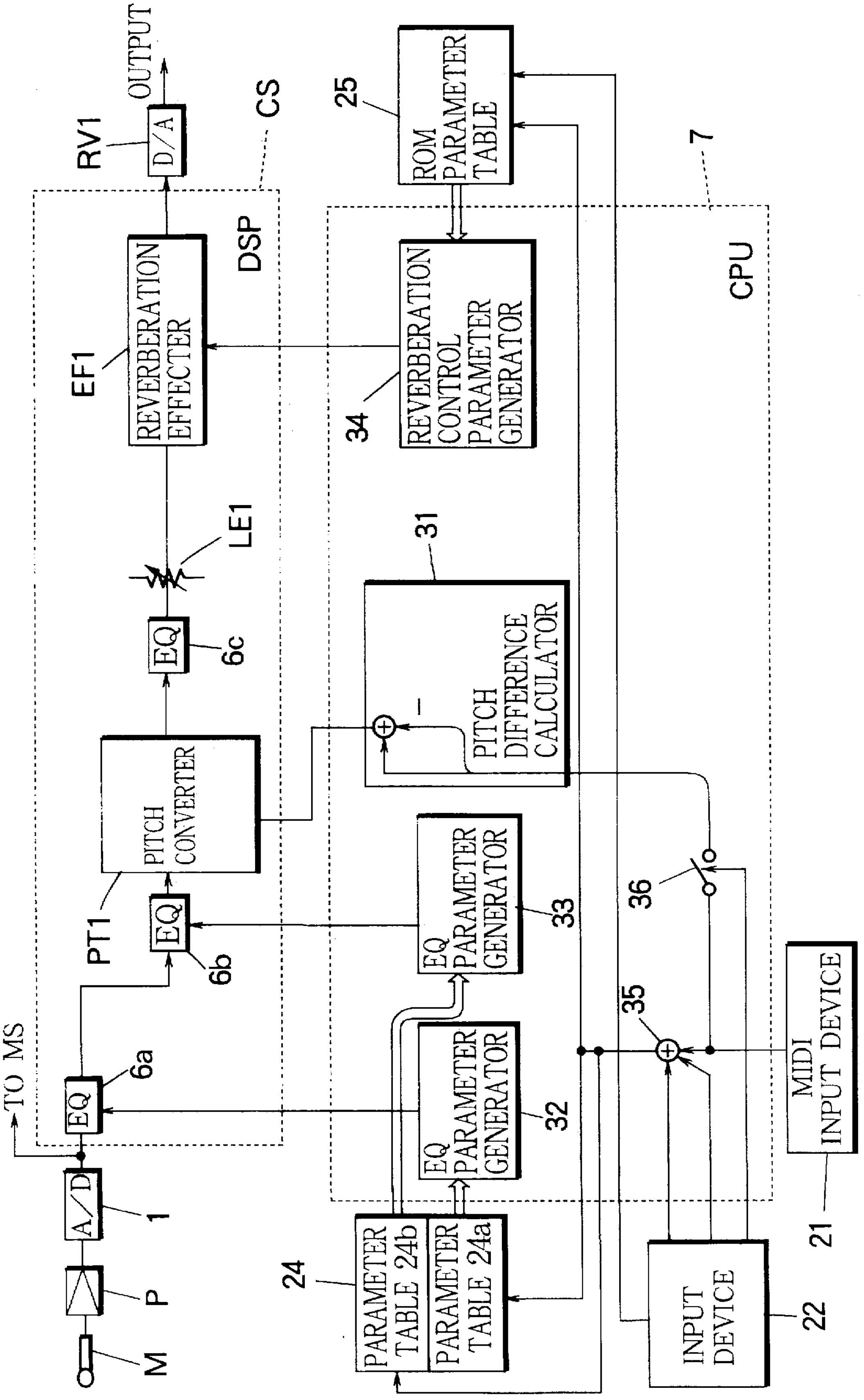
FIG. 2 is a block diagram showing detailed structure of the inventive apparatus.

FIG. 2 shows detailed construction of one channel of the chorus system CS provided in the chorus apparatus according to the present invention. The apparatus may be employed in an online network karaoke system which receives song data in MIDI format from a host computer via communication network, which stores the song data in a hard disk or CD-ROM, and which transmits or download a requested song by reading out the stored song data.

In FIG. 2, the apparatus comprises a MIDI input device 21 to accept MIDI song data from external memory media (not shown) such as a hard disk, a manual input device 22 to interface with users, a CPU (Central Processing Unit) 7 to control each device and to compute control parameters, ROMs (Read Only Memory) 24 and 25 storing tables of control parameters, a preamplifier P to amplify a vocal sound picked up by microphone M, an A/D (Analog/Digital) converter 1 to convert an analog signal of the amplified vocal sound into a digital signal, a chorus system CS composed of a DSP (Digital Signal Processor) to carry out a variety of signal processing for the digitally converted vocal signal, and a D/A (Digital/Analog) converter RV1 to convert the processed digital signal into an analog signal and to feed it to an external sound system (not shown).

The external memory medium such as the hard disk stores the song data of each entry karaoke song, including a main melody data representative of a main melody pattern, an accompaniment data used to reproduce an accompanying instrumental sound, and a chorus melody data representative of a monophonic or polyphonic melody chorus pattern corresponding to the main melody pattern. The song data may be transmitted from the host computer. Each song data further contains mode information such as a music genre data (e.g., pops, jazz, ballad etc.) of the song, and a select data effective to select either of a harmony mode accompanied with the chorus sound or a normal mode without the chorus sound. In the reproduction of the karaoke accompaniment, the accompaniment data is fed to a tone generator (not shown) to reproduce the karaoke accompaniment. At the same time, the main melody data, the chorus melody data and the mode information are fed to the CPU 7, while being converted from MIDI domain to TTL domain.

The input device 22 is accommodated in the apparatus, or provided as a remote controller. The input device 22 accepts user's manual input commands, and outputs control information in response to the commands to the CPU 7. The user inputs various data including male/female discrimination, delay time/repeat gain of reverberation to be added to the vocal sound and so on, in addition to the mode information. The input device 22 is used to control parameters which should be adjusted according to preference of the user, tone or volume of the voice, performance of EQ (equalizer), and echo level (repeat gain) or delay time of an effecter. These parameters are preset for individual users in a memory, and are read out from the memory. The mode information can be inputted from either of the MIDI input device 21 and the manual input device 22 by selecting 'automatic input' or 'manual input' alternatively. Thus, if 'automatic input' is selected by the operation of the device 22, the mode information provided through the MIDI input device 21 is adopted. On the other hand, if 'manual input' is selected, the mode information provided through the manual input device 22 is adopted.

The CPU 7 executes a predetermined control program to carry out prescribed functions as achieved by the following blocks 31 to 36. A pitch difference calculator 31 calculates a pitch difference between the main melody pattern and the chorus melody pattern. The obtained value of the pitch shift (pitch difference) is inputted to the DSP. An EQ (equalizer) parameter generator 32 sets filtering factors of an input equalizer 6a contained in the DSP according to control parameters read out from a parameter table 24a of the ROM 24 in response to the mode information. Another EQ parameter generator 33 sets up filtering factors of a chorus input equalizer 6b contained in the DSP according to control parameters which are read out from another parameter table 24b of the ROM 24 in response to attribute information. The EQ parameter generator 33 further sets up filtering factors of an output equalizer 6c and a volume of a chorus level controller LE1. A reverberation control parameter generator 34 sets filtering factors of a reverberation effecter EF1 contained in the DSP according to control parameters which are read out from a parameter table stored in the ROM 25 in response to the mode information and the input values of delay time and repeat gain. An automatic/manual selector 35 is actuated to take the mode information and attribute information from the manual input device 22 when 'manual input' is selected by the operation of the device 22. Then, the mode and attribute information is fed to the ROMs 24 and 25 to specify filter and reverberation parameter data in the tables of the ROMs 24 and 25. On the other hand, if 'automatic input' is selected, the automatic/manual selector 35 is switched to take the mode and attribute information from the MIDI input device 21. Then, the mode and attribute information is fed to the ROMs 24 and 25 to specify filter and reverberation parameter data in the parameter tables of the ROMs 24 and 25. A mode selector 36 is turned on if the harmony mode is selected by the operation of the input device 22. Consequently, the main melody data and the chorus melody data are distributed from the MIDI input device 21 to the pitch difference calculator 31. On the other hand, if the normal mode is selected, the mode selector 36 is turned off. Consequently, the data is not supplied to the pitch difference calculator 31.

As described above, the parameter tables 24a and 24b are allocated in the ROM 24, and the tables store the control parameters to be set in the input equalizer 6a and the chorus input equalizer 6b of the DSP. According to the attribute information such as male/female identification and personal preference, the parameter table 24b specifies filtering factors to be set in the equalizer 6b such as filter cutoff frequencies, frequencies dominating equalizer characteristics, gain, and Q value. The table 24b is also accessed to specify the chorus output level of the chorus level controller LE1. The other parameter table 24a is accessed in similar manner to specify control factors to be set in the input equalizer 6a according to the mode information such as a reproduction mode, the genre of the song and so on. The ROM 25 stores the parameter table used to set control factors in the reverberation effecter EF1 accommodated in the DSP. The parameter table stores control parameters such as echo level, delay time, repeat gain etc., which are set in the reverberation effecter EF1 according to the mode information described above.

The DSP is comprised of the input equalizer 6a, the chorus input equalizer 6b, the chorus output equalizer 6c, a pitch converter PT1, the chorus level controller LE1 and the reverberation effecter EF1. The input equalizer 6a is comprised of a quadratic HPF (High Pass Filter), a linear LPF (Low Pass Filter), and three-staged equalizer units connected in series. The cutoff frequencies of the HPF and LPF and the filter factors of each equalizing unit (frequencies, gain, and Q) are set up by the EQ parameter generator 32 as described above. The chorus input equalizer 6b is comprised of a serial connection of a quadratic LSF (Low Shelving Filter), a quadratic HSF (High Shelving Filter), and a single equalizer unit. The cutoff frequencies of the LSF and HSF and the filter factors of the equalizing unit (frequencies, gain, and Q) are established by the EQ parameter generator 33 as described above. The pitch converter PT1 shifts the pitch of the output of the equalizer 6b according to the pitch difference between the main melody pattern and the chorus melody pattern, calculated by the pitch difference calculator 31. For the pitch converter PT1, it is possible to employ a conventional arrangement disclosed in JP-A-62-89095, for example. In this arrangement, a target frequency after the pitch shift is registered correspondingly to the pitch shift value for each note. The chorus output equalizer 6c eliminates unnecessary frequency components such as a noise yielded by the pitch shift of the pitch converter PT1 in the chorus sound. The chorus level controller LE1 adjusts the chorus sound level or volume when mixed to the singer's vocal sound. The reverberation effecter EF1 imparts various effects such as 'reverb', 'echo' and so on to the chorus sound signal.

What is claimed is:

1. A karaoke apparatus for creating an artificial chorus sound and an instrument karaoke accompaniment in parallel with a live vocal sound which is a live singing voice, the karaoke apparatus comprising:

a pickup device that collects the live vocal sound and converts the collected live vocal sound into a corresponding vocal sound signal;

a generator device that generates a chorus sound signal representative of an artificial chorus sound, that is a synthesized singing voice belonging to a different melodic part than the live singing voice, in synchronization with the vocal sound signal; and a plurality of output devices installed separately from each other to define different sound sources, one of the output devices receiving the vocal sound signal and acoustically reproducing therefrom the live vocal sound, and another of the output devices receiving the chorus sound signal and acoustically reproducing therefrom the artificial chorus sound so that the live vocal sound and the artificial chorus sound can be mixed as if sounded from different sound sources.

2. A karaoke apparatus according to claim 1, wherein the generator device generates a multiple of chorus sound signals representative of multiple parts of the artificial chorus sound, and wherein corresponding ones of the output devices receive the respective chorus sound signals separately from each other to concurrently reproduce the multiple parts of the artificial chorus sound.

3. A karaoke apparatus according to claim 1, wherein the generator device processes the vocal sound signal to modify the same into the chorus sound signal so that the artificial chorus sound depends on and originates from the live vocal sound.

4. A karaoke apparatus according to claim 3, wherein the generator device comprises a memory that stores a main melody data representative of a main melody pattern of the live vocal sound and a chorus melody data representative of a chorus melody pattern of the artificial chorus sound, a pitch difference calculator that sequentially retrieves the main melody data and the chorus melody data from the memory in synchronization with progression of the live vocal sound and that calculates a pitch difference between the main melody pattern and the chorus melody pattern according to the retrieved main melody data and the chorus melody data, and a pitch converter that shifts a pitch of the vocal sound signal by the calculated pitch difference to generate the chorus sound signal.

5. A karaoke apparatus according to claim 1, wherein the generator device comprises a data source that provides a waveform data sampled from a model chorus sound, and a decoder that sequentially receives the waveform data and decodes the waveform data to generate the chorus sound signal so that the artificial chorus sound is reproduced in the form of the model chorus sound which is independent from the live vocal sound.

6. A method of creating an artificial chorus sound and an instrument karaoke accompaniment in parallel with a live vocal sound which is a live singing voice for a karaoke apparatus, the method comprising the steps of:

collecting the live vocal sound;

converting the collected live vocal sound into a corresponding vocal sound signal;

generating a chorus sound signal representative of an artificial chorus sound, that is a synthesized singing voice belonging to a different melodic part than the live singing voice, in synchronization with the vocal sound signal; and installing a plurality of separate output devices to define different sound sources, one of the plurality of separate output devices receiving the vocal sound signal and acoustically reproducing therefrom the live vocal sound, and another of the plurality of separate output devices receiving the chorus sound signal and acoustically reproducing therefrom the artificial chorus sound so that the live vocal sound and the artificial chorus sound can be mixed as if sounded from different sound sources.

7. A method according to claim 6, further comprising the steps of generating multiple chorus sound signals representative of multiple parts of the artificial chorus sound, and wherein corresponding ones of the output devices receive the respective chorus sound signals separately from each other to concurrently reproduce the multiple parts of the artificial chorus sound.

8. A method according to claim 6, wherein the step of generating the chorus sound signal further includes the step of processing the vocal sound signal to modify the same into the chorus sound signal so that the artificial chorus sound depends on and originates from the live vocal sound.

9. A method according to claim 8, wherein the step of generating the chorus sound signal further comprises the steps of:

storing a main melody data representative of a main melody pattern of the live vocal sound and a chorus melody data representative of a chorus melody pattern of the artificial chorus sound;

sequentially retrieving the main melody data and the chorus melody data in synchronization with progression of the live vocal sound;

calculating a pitch difference between the main melody pattern and the chorus melody pattern according to the retrieved main melody data and the chorus melody data; and shifting a pitch of the vocal sound signal by the calculated pitch difference to generate the chorus sound signal.

10. A method according to claim 6, wherein the step of generating the chorus sound signal comprises the steps of:

providing a waveform data sampled from a model chorus sound;

sequentially receiving the waveform data; and decoding the waveform data to generate the chorus sound signal so that the artificial chorus sound is reproduced in the form of the model chorus sound which is independent from the live vocal sound.

11. A karaoke apparatus for creating an artificial chorus sound and an instrument karaoke accompaniment in parallel with a live vocal sound which is a live singing voice, the karaoke apparatus comprising:

a pickup device that collects the live vocal sound and converts the collected live vocal sound into a corresponding vocal sound signal;

a generator device that generates a chorus sound signal representative of an artificial chorus sound, that is a synthesized singing voice generated by pitch shifting the live singing voice, in synchronization with the vocal sound signal; and a plurality of output devices installed separately from each other to define different sound sources, one of the output devices receiving the vocal sound signal and acoustically reproducing therefrom the live vocal sound, and another of the output devices receiving the chorus sound signal and acoustically reproducing therefrom the artificial chorus sound so that the live vocal sound and the artificial chorus sound can be mixed as if sounded from different sound sources.

12. A karaoke apparatus according to claim 11, wherein the generator device generates a multiple of chorus sound signals representative of multiple parts of the artificial chorus sound, and wherein corresponding ones of the output devices receive the respective chorus sound signals separately from each other to concurrently reproduce the multiple parts of the artificial chorus sound.

13. A karaoke apparatus according to claim 11, wherein the generator device processes the vocal sound signal to modify the same into the chorus sound signal so that the artificial chorus sound depends on and originates from the live vocal sound.

14. A karaoke apparatus according to claim 13, wherein the generator device comprises a memory that stores a main melody data representative of a main melody pattern of the live vocal sound and a chorus melody data representative of a chorus melody pattern of the artificial chorus sound, a pitch difference calculator that sequentially retrieves the main melody data and the chorus melody data from the memory in synchronization with progression of the live vocal sound and calculates a pitch difference between the main melody pattern and the chorus melody pattern according to the retrieved main melody data and the chorus melody data, and a pitch converter that shifts a pitch of the vocal sound signal by the calculated pitch difference to generate the chorus sound signal.

15. A karaoke apparatus according to claim 11, wherein the generator device comprises a data source that provides a waveform data sampled from a model chorus sound, and a decoder that sequentially receives the waveform data and decodes the waveform data to generate the chorus sound signal so that the artificial chorus sound is reproduced in the form of the model chorus sound which is independent from the live vocal sound.

* * * * *